US006523818B1

(12) United States Patent
Le Vert et al.

(10) Patent No.: US 6,523,818 B1
(45) Date of Patent: Feb. 25, 2003

(54) APPARATUS AND METHOD FOR SECURING A WORK OBJECT

(75) Inventors: Richard Francis Le Vert, Victoria (CA); Martin Philip Sommerard, Sidney (CA)

(73) Assignee: Le Mac Enterprises Ltd., Victoria (CA)

( * ) Notice: Subject to any disclaimer, the term of this patent is extended or adjusted under 35 U.S.C. 154(b) by 0 days.

(21) Appl. No.: 09/698,112

(22) Filed: Oct. 30, 2000

(51) Int. Cl.[7] .......... B23Q 3/02

(52) U.S. Cl. .......... 269/96; 269/69; 269/101; 269/165; 81/41; 81/67; 211/13.1

(58) Field of Search .......... 269/96, 55, 71, 269/902, 296, 13, 14

(56) References Cited

U.S. PATENT DOCUMENTS

| | | | | | |
|---|---|---|---|---|---|
| 1,336,755 | A | * | 4/1920 | Parmelee | 269/96 |
| 2,971,411 | A | * | 2/1961 | Dull | 269/96 |
| 3,578,307 | A | * | 5/1971 | Lock | 269/96 |
| 4,151,764 | A | * | 5/1979 | Bunn | 81/100 |
| 4,363,475 | A | * | 12/1982 | McCarty | 269/69 |
| 5,765,822 | A | * | 6/1998 | Mead | 269/96 |
| 5,791,213 | A | | 8/1998 | Young | |
| 5,941,396 | A | * | 8/1999 | LeVert | 211/13.1 |
| 6,290,280 | B1 | * | 9/2001 | Riekse | 296/97.6 |
| 6,336,391 | B1 | * | 1/2002 | McDonnell | 81/57.33 |

* cited by examiner

*Primary Examiner*—Joseph J. Hail, III
*Assistant Examiner*—Daniel Shanley
(74) *Attorney, Agent, or Firm*—Oyen Wiggs Green & Mutala

(57) ABSTRACT

This invention provides a novel apparatus and method for securing a work object, such as a pipe, conduit, bar, rod or the like, using a wrench or other gripping tool that acts as a second set of hands. The wrench is pivotally attached to a support that has a receiving location wherein a work object sits. The wrench can be rotated about its end opposite the mouth so that the mouth engages the work object, and the wrench is held in engagement with the work object by the force of gravity. When a pipe wrench is gripping a work object in such a way, the work object will be prevented from rotating in one sense, thereby allowing someone practising this invention to use both hands to apply a torque to the work object.

29 Claims, 12 Drawing Sheets

APPARATUS AND METHOD FOR SECURING A WORK OBJECT

FIELD OF THE INVENTION

This invention relates to a novel apparatus and method for securing a pipe or work object to prevent it from rotating while applying a torque to the object. The apparatus of this invention has particular application in situations where tradespeople such as plumbers and electricians need to steady a pipe or conduit they are working on.

BACKGROUND OF THE INVENTION

Workers such as plumbers and electricians sometimes need to hold a work object such as a pipe, conduit, bar, rod or the like steady while applying to it a rotational force, for example to cut or thread a pipe, or to attach or remove a fitting. The known methods for holding a work object steady involve either large, cumbersome devices such as pipe vises which are not easily transported, or are awkward and can involve discomfort to the worker.

There are currently a number of different types of chain vises available in the marketplace which can be used to hold a pipe or other elongated work object in place while cutting it or threading one end, or while tightening or loosening a threaded connection. These vises are typically not easily mobile. While they can be carried between job sites they are typically cumbersome enough that it is not convenient to move them to each location on ajob site where work objects are being handled. On a typical job site where a chain vise is available the worker carries the work object which needs to be secured to the chain vise, performs the required task, and then carries the work object back to the desired location. This is undesirable because the time taken to travel back and forth to the chain vise causes lengthy delays for a worker with a number of tasks to perform on work objects located in a number of different places.

When a worker has a number of small tasks to complete at various locations which require a pipe or work object to be secured, it is common practice to use a pipe wrench to engage the work object. For example, where a worker needs to attach a fitting to a pipe the worker will typically hold the pipe steady by kneeling on the handle of a pipe wrench, with its jaws facing upward engaging the pipe, and while doing so, attach the fitting to the end of the pipe. Needless to say, this method is awkward, requires a certain level of skill and balance, and is difficult for those workers with knee or back problems.

A pipe wrench has a fixed jaw and an adjustable jaw that is also capable of “rocking” a few degrees so that it uses the principle of a wedge to pinch and therefore hold the work. The more rotational torque applied to the work, the tighter the wrench holds. A pipe wrench is ideally utilized with the jaws facing down so that gravity assists the moveable “rocking” jaw at the initial gripping of the work. The pipe wrench will also function with the jaws facing upward but the jaws do not firmly grip the work until the rotational torque is applied to cause the “rocking” jaw to bite into the work via the wrench’s serrated jaws. This means that a second wrench is needed to apply a torque if the pipe wrench is to have the jaws facing upward, making it awkward to perform the required task.

It is known for workers to use various stands or sawhorses when they have to hold or cut a pipe. One example of a portable stand is the Rack-A-Tiers® (protected by U.S. Pat. No. 5,941,396 entitled WIRE DISPENSER STAND), available from Rack-A-Tiers Mfg. Inc. of Victoria, British Columbia, Canada. This stand is used in pairs as a wire coil holder and it can be used for supporting conduit and pipe for cutting. The worker places the work object in the “V” notches on the top of the stand, and either holds it down with one foot, hand or knee, or holds it with a pipe wrench held in one hand while doing work on the work object with a free hand. Gravity holds the work object in the “V” notches which prevent the work from rolling off the top of the stands while work is done to the work object. The “V” notches do not prevent the conduit from rotating in the “V” if rotational torque is applied.

It is also known for workers to use a stand to hold a pipe wrench upright while engaging a pipe so that another pipe wrench can engage the pipe, as disclosed in U.S. Pat. No. 5,791,213 entitled PIPE WRENCH STAND.

There is a strong need for a tool and method that can act as a second set of hands to hold work objects. The tool and method should be both highly portable and easy to use.

SUMMARY OF THE INVENTION

This invention provides a method for holding work objects which uses a work object engaging member which preferably comprises a pipe wrench to secure a work object, such as a pipe, conduit, rod, bar, tube or the like in order to prevent the work object from rotating. The wrench has a handle and a mouth, and is engaged by a pivoting member which defines an axis near an end of the handle. The axis is held in fixed or slidable relation to a support. There is a receiving location defined by a notch, recess, protrusion or the like on a top of the support. The work object is held in the receiving location and is prevented from moving laterally. The pivoting member is in a position that allows the wrench to be rotated around the axis so that the mouth of the wrench engages the work object and prevents the work object from rotating in one sense.

By altering the position of the axis relative to the receiving location, the wrench can be used to prevent the work object from rotating in an opposite sense. The invention also provides for employing two wrenches to engage the work object from either side, thereby preventing rotation in either sense. To accomplish this, a second support can be placed adjacent the first support so that the receiving locations of both supports are in alignment, with the second support rotated 180 degrees in relation to the first support. This arrangement allows the first wrench to engage the work object from one side and a second wrench to engage the work object from an opposite side, thereby preventing rotation altogether.

One embodiment of the apparatus comprises a support with a receiving location therein, a work object engaging member, and a pivoting member. The receiving location is capable of receiving a work object, and the pivoting member defines an axis of rotation for the work object engaging member, such that when a work object is disposed in the receiving location, the work object engaging member can be rotated about the axis defined by the pivoting member and engage the work object.

Alternatively, another embodiment of the apparatus comprises the support with the receiving location and the pivoting member configured to be able to accommodate a work engaging member.

A further alternative embodiment of the apparatus comprises a pivoting member configured to accommodate two work engaging members.

One embodiment of the method uses the support with the receiving location, the work engaging member, and the pivoting member, and comprises the steps of engaging the work engaging member with the pivoting member, securing the pivoting member so that it defines an axis, positioning a work object in the receiving location, and rotating the work engaging member about the axis so that it engages the work object.

The invention holds the pipe wrench handle in the manner and orientation in which the operators hand(s) would normally hold the pipe wrench, thus freeing the operator to operate a second wrench or tool. Further aspects and advantages of the invention are set out below.

BRIEF DESCRIPTION OF THE DRAWINGS

In the drawings, which illustrate embodiments of the invention, with the understanding that they do not illustrate the only possible embodiments of the invention:

FIG. 6AA is a detail isometric view of the pivoting member of FIG. 6A;

FIG. 6BB is a detail isometric view of the pivoting member of FIG. 6B;

DETAILED DESCRIPTION OF THE INVENTION

Figure 1:
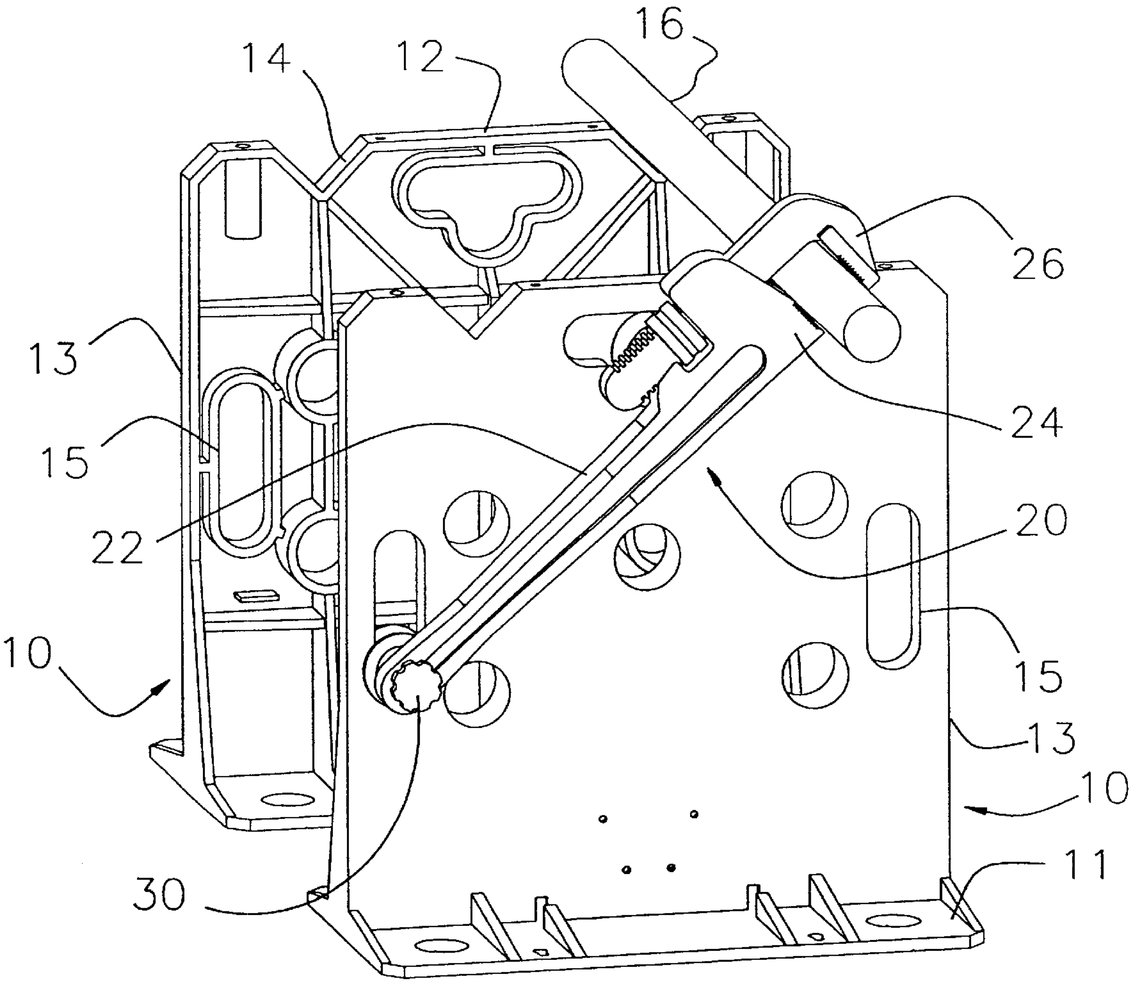
FIG. 1 is an isometric view of apparatus according to the invention in operation.

FIG. 1 is an isometric view of a specific preferred embodiment of this invention. In this embodiment, a support 10 is in the form of a portable rectangular stand having sides 13, a base 11, and with receiving locations 14 defined by V-shaped notches in a top 12. Support 10 has a vertical slot 15 near each side 13. Engaging member 20 (a pipe wrench in this embodiment) is pivotally and detachably secured to support 10 by means of a pivoting member 30 which engages a handle 22 of engaging member 20. Pivoting member 30 is received in slot 15.

When a work object 16 rests in a receiving location 14, engaging member 20 can be rotated into engagement with work object 16. It is to be understood that while the embodiment of FIG. 1 may be a preferred embodiment, other embodiments are also within the scope of this invention.

The preferred embodiment of this invention provides a support 10 with a receiving location 14 along a top 12 thereof. Support 10 is capable of supporting a work object 16 such as a length of pipe. Support 10 may be stationary (e.g. a work bench) or it may be portable (e.g. a saw horse or stand). In the preferred embodiment receiving location 14 is defined by a V-shaped notch, but it is to be understood that there are other possible configurations of receiving location 14 (e.g. a recess or pair of protrusions) that are within the scope of this invention. The only requirement of receiving location 14 is that it functions to hold a work object 16 in a defined location and, prevents the work object 16 from sliding along the top 12 of support 10.

Figure 2:
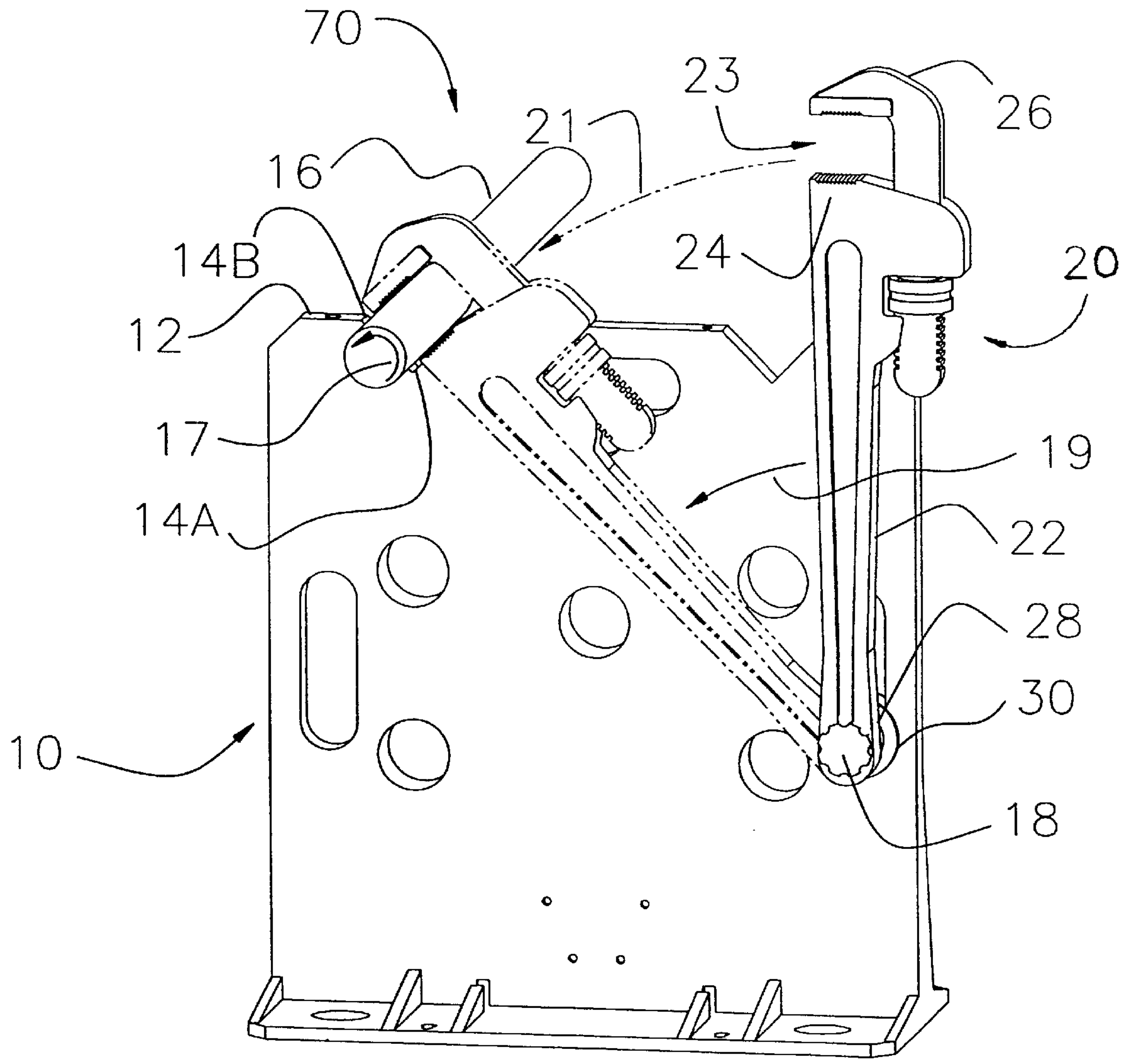
FIG. 2 is a schematic isometric view of the basic elements of the invention.

The operation of an apparatus 70 is illustrated by FIG. 2. This embodiment of the invention employs as the engaging member a pipe wrench 20 with a handle 22 and a mouth 23. Mouth 23 is defined between a fixed jaw 24 and a movable jaw 26. Handle 22 has an end 28 opposite mouth 23. End 28 is pivotally attached to support 10 by a pivoting member 30, which permits wrench 20 to rotate relative to support 10 about an axis 18. The preferred embodiment employs a standard pipe wrench (e.g. a RIGID® model 818 ALUMINUM H.D.). Such wrenches have an eye which can be used in attaching wrench 20 to pivoting member 30 as described below.

The axis 18 is positioned so that when the wrench 20 is rotated, an arc 21 traced by the fixed jaw 24 passes just above a first wall 14A of the receiving location 14.

To use apparatus 70, a worker places the work object 16 in the receiving location 14, wherein it rests against the first wall 14A and a second wall 14B. The worker then rotates the wrench 20 about the axis 18 in the direction of arrow 19 until the work object 16 is within the mouth 23, and is resting against the second wall 14B and the fixed jaw 24. Gravity holds the wrench 20 so that the mouth 23 engages the work object 16. The worker then adjusts the movable jaw 26 until it comes into contact with the top side of the work object 16. While the jaws 24 and 26 grip the work object 16, the work object 16 is prevented from rotating in a first sense 17. It is to be understood that the work object could be prevented from rotating in a second sense opposite to the first sense 17 by an embodiment of the invention which is a mirror image of the structure illustrated by FIG. 2.

Figure 3:
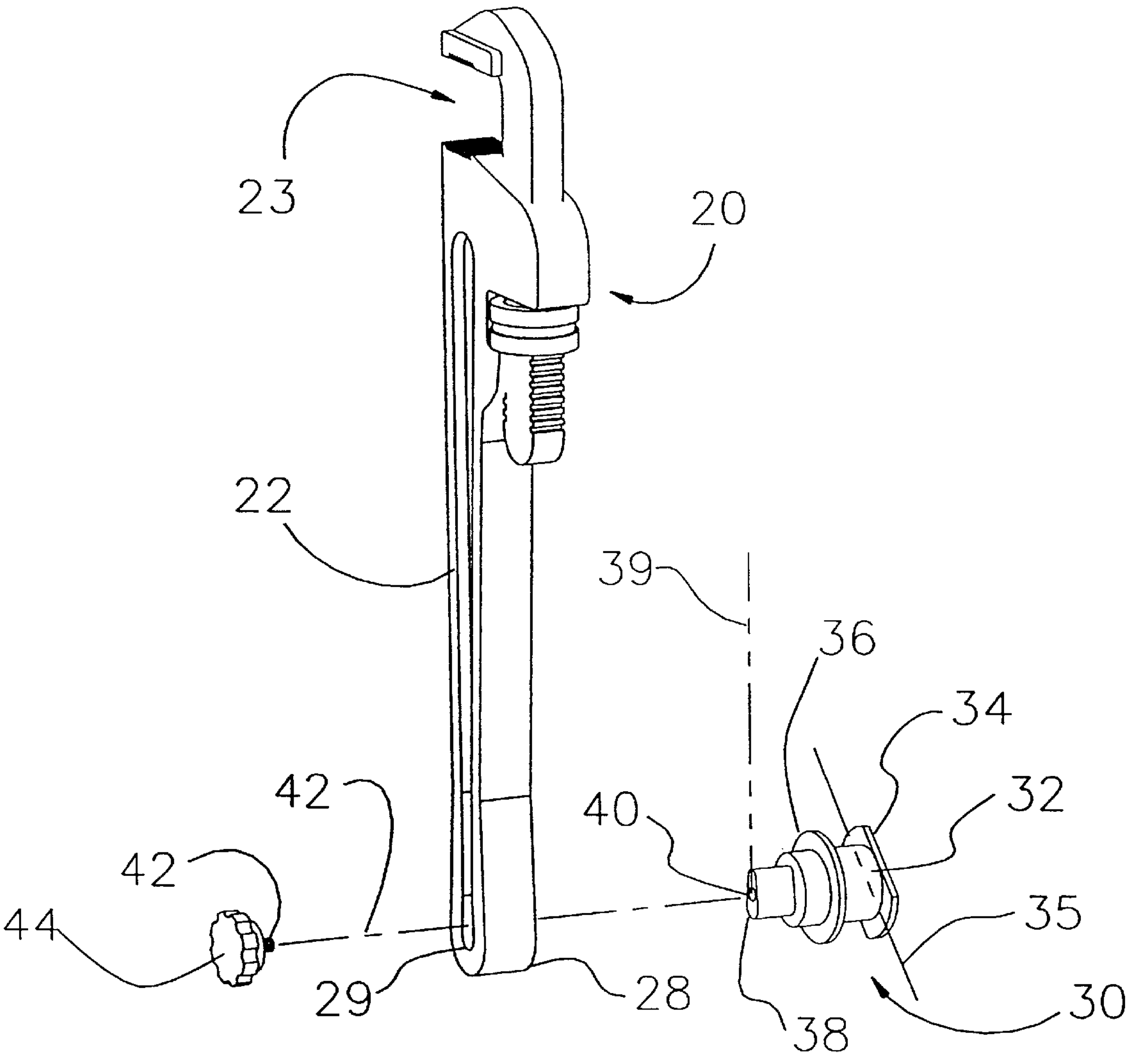
FIG. 3 is an exploded perspective view of a preferred embodiment of the pivoting member shown in relation to the pipe wrench.

FIGS. 3, 4, 5A, 5B, 5C and 5D illustrate a preferred embodiment of the pivoting member 30. Pivoting member 30 of FIG. 3 is intended for use with an embodiment wherein the support 10 has a slot 15 as shown in FIG. 1, and wherein the wrench 20 has an eye 29 near the end 28. The eye 29 is similarly shaped and is typically elongated in many commercially available wrenches (e.g. a RIGID® model 818 ALUMINUM H.D.).

Figure 4:
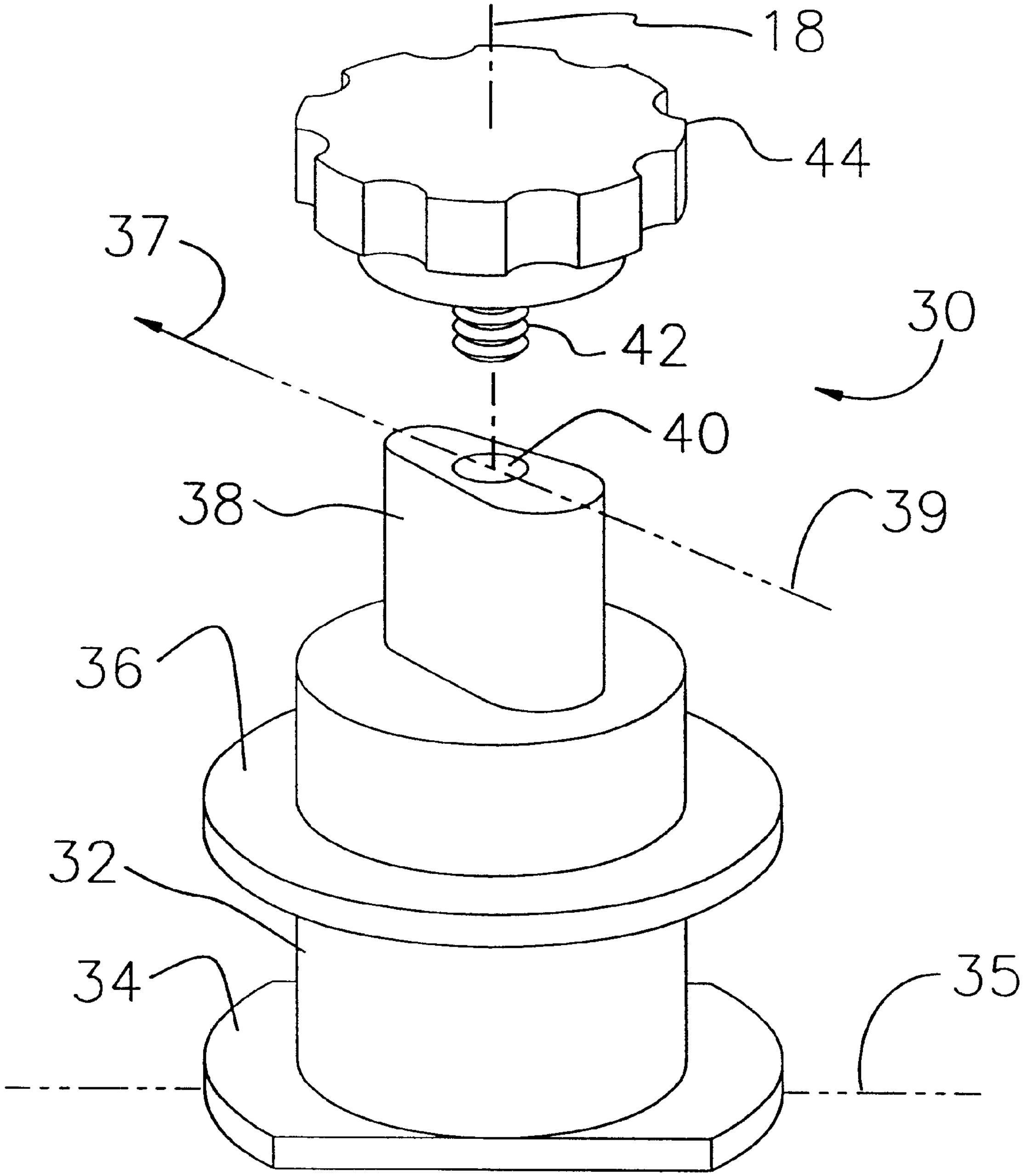
FIG. 4 is an exploded perspective view of the pivoting member of FIG. 3.
Figure 5A:
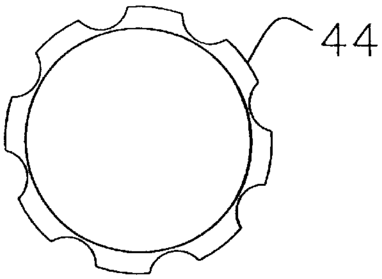
FIG. 5A is a top view of the knob of the pivoting member of FIG. 3.
Figure 5B:
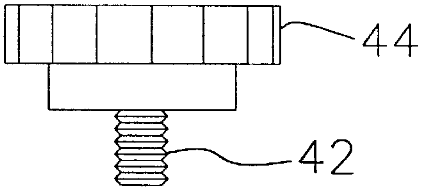
FIG. 5B is a side view of the knob of the pivoting member of FIG. 3.
Figure 5C:
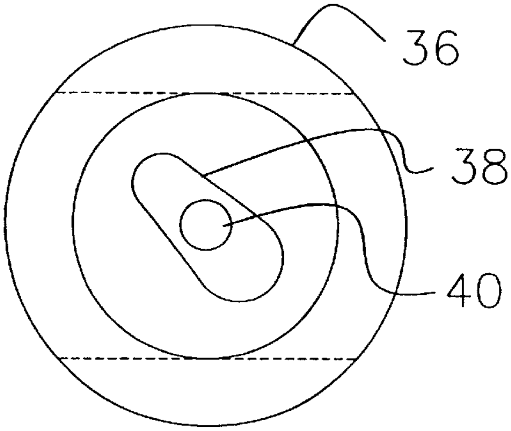
FIG. 5C is a top view of a portion of the pivoting member of FIG. 3 without the knob.
Figure 5D:
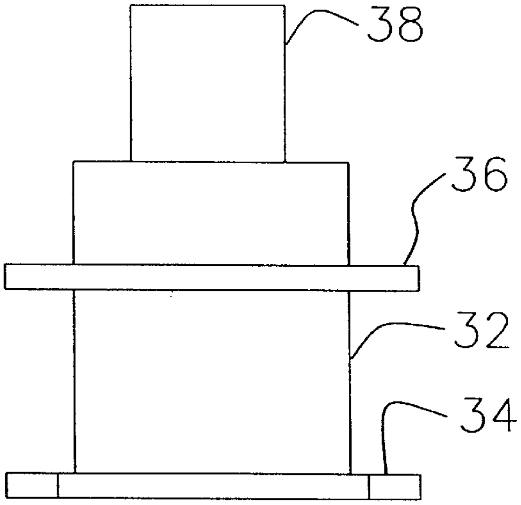
FIG. 5D is a side view of a portion of the pivoting member of FIG. 3 without the knob.

A first function of pivoting member 30 is to engage wrench 20, preferably non-rotationally. In order to engage wrench 20, pivoting member 30 is provided with an elongated projection 38, shaped so as to fit through eye 29 in handle 22 of wrench 20. As best seen in FIG. 5C, elongated projection 38 comprises a cylinder with a cross section, generally in the shape of a rounded teardrop. Eye 29 on many pipe wrenches has this shape. Elongated projection 38 is elongated in a direction along a reference line 39. Elongated projection 38 has a threaded hole 40 which receives a screw 42 with a large knob 44. Knob 44 is preferably large in order to secure the pivoting member 30 to the wrench 20, and to enable a user to tighten and loosen the screw 42 by hand. A user can engage wrench 20 with pivoting member 30 by removing knob 44, inserting elongated projection 38 through eye 29, and then replacing knob 44. As illustrated by FIG. 4, when the pivoting member 30 engages the wrench 20, the handle 22 extends in a direction 37 away from the axis 18 along the reference line 39.

A second function of pivoting member 30 is to rotatably engage support 10. Elongated projection 38 has a cylinder 32 attached at an end opposite knob 44. Cylinder 32 has a circular stabilizer 36 attached near an end near elongated projection 38. To an end of cylinder 32 opposite elongated projection 38, a truncated flange 34 is attached, centred on a reference line 35. A distance between circular stabilizer 36 and truncated flange 34 is equal to a thickness of support 10 of FIG. 2.

Figure 6A:
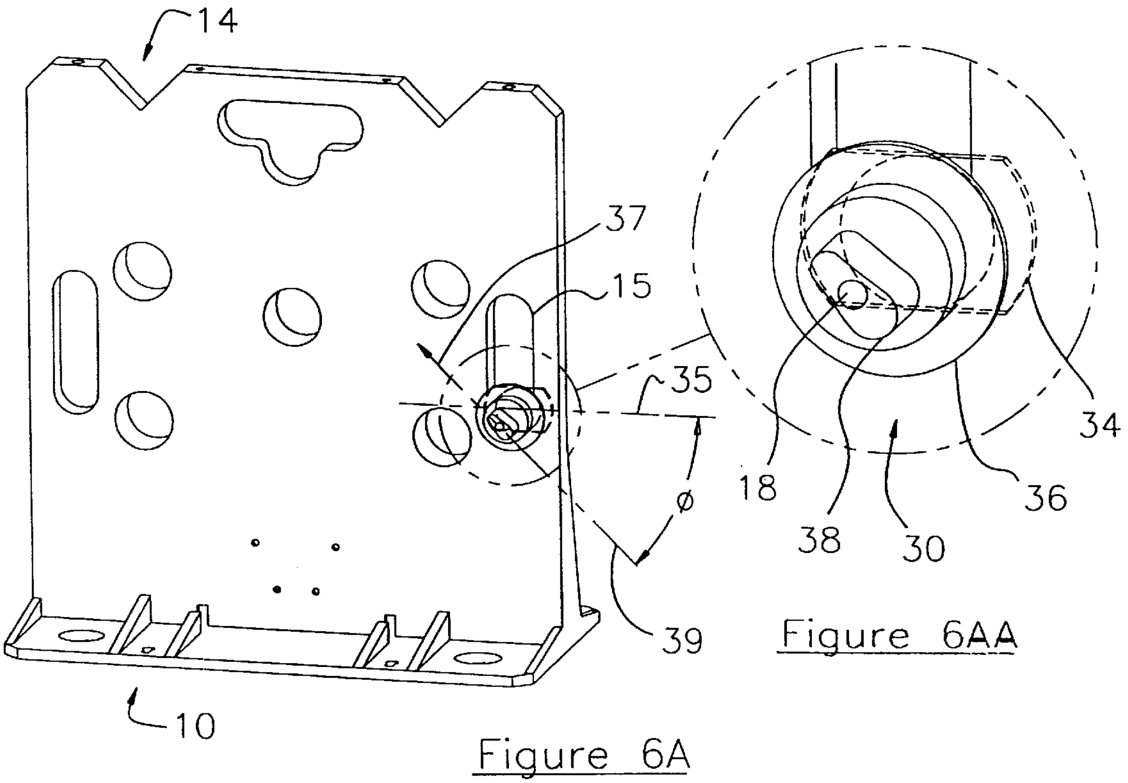
FIG. 6A is an isometric view of the pivoting member of FIG. 3 in a first position in a slot.
Figure 11:
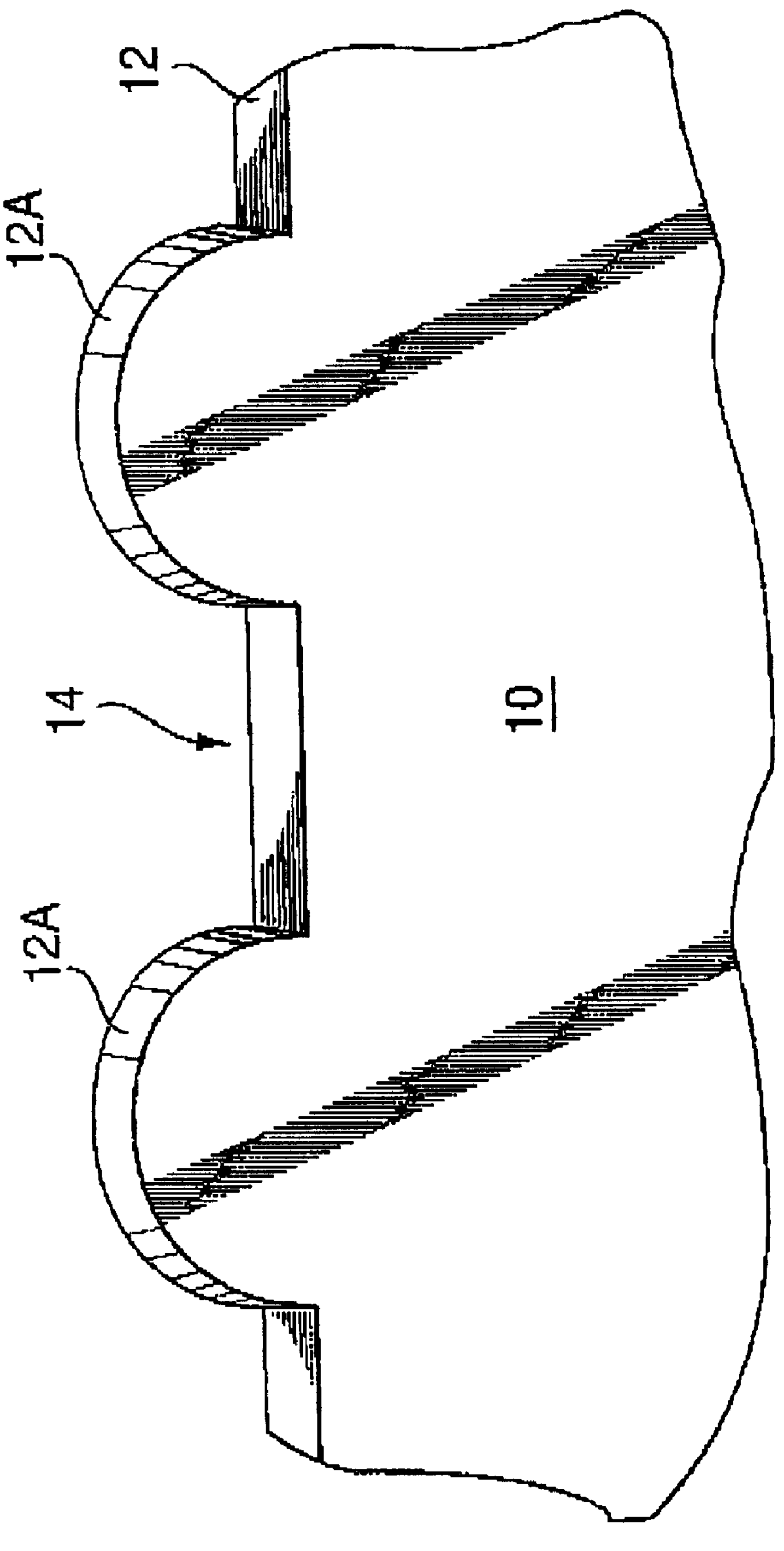
FIG. 11 is a front elevation view of a top edge of a support which includes a work object receiving location defined between a pair of projections.

As best seen in FIGS. 6A and 6AA, when pivoting member 30 of FIG. 3 is inserted through slot 15 and rotated so that direction 37 is generally towards receiving location 14, truncated flange 34 prevents pivoting member 30 from being removed from slot 15, and causes circular stabilizer 36 to be flush with support 10. An angle $\phi$ is formed between reference line 35 and reference line 39. Angle $\phi$ is between 30 and 70 degrees, preferably between 40 and 60 degrees and, in a preferred embodiment, is 50 degrees. FIG. 11 shows a portion of top 12 of a support 10 according to another embodiment of the invention. In the FIG. 11 embodiment, a work object receiving location 14 is defined between a pair of projections 12A on support 10. It is to be understood that the invention includes a wide range of angles, so long as the angle $\phi$ is not such that when the direction 37 is generally towards the receiving location 14, truncated flange 34 is in substantial alignment with slot 15.

Figure 6B:
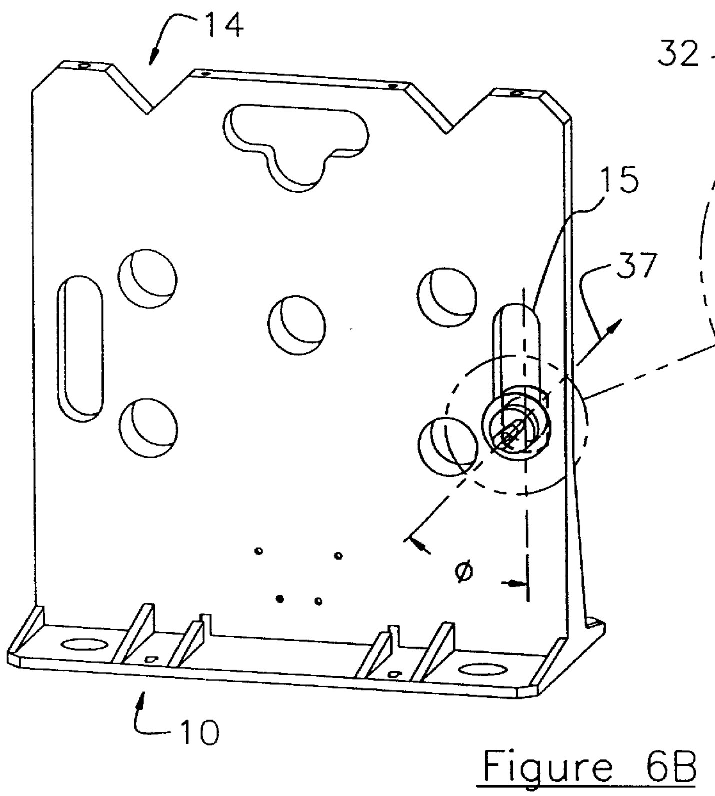
FIG. 6B is the same as FIG. 6A, but with the pivoting member in a second position.
Figure 6B:
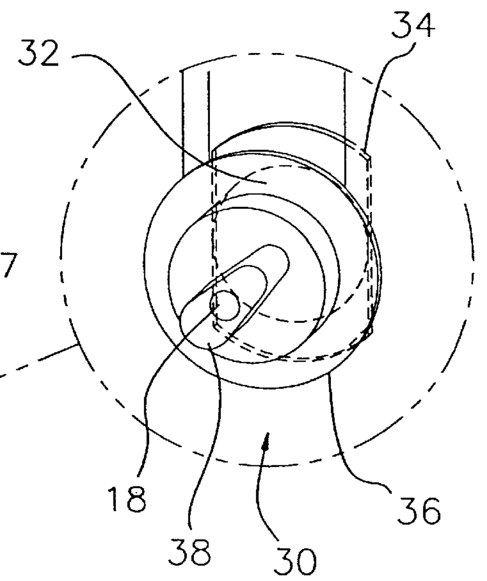

As best seen in FIGS. 6B and 6BB, cylinder 32 has a diameter which is equal to a width of truncated flange 34, and the diameter of cylinder 32 and the width of truncated flange 34 are slightly smaller than a width of slot 15 so that when truncated flange 34 is aligned with slot 15 as in FIGS. 6B and 6BB, truncated flange 34 and cylinder 32 can pass through slot 15, allowing for detachment and re-attachment of pivoting member 30 to support 10.

Figure 7:
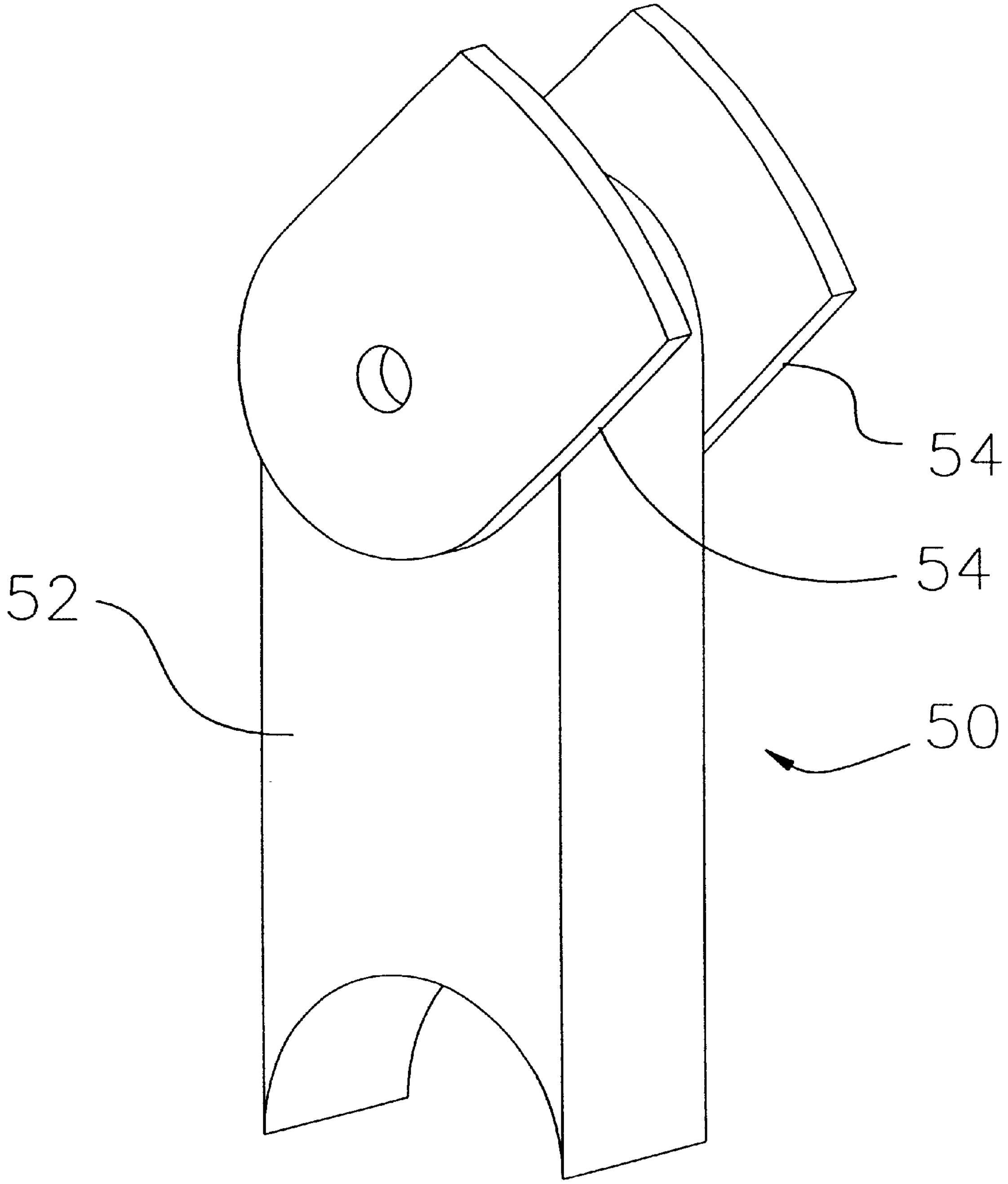
FIG. 7 is an isometric view of a preferred embodiment of a stop member for use with a support wherein the support has a slot.
Figure 8A:
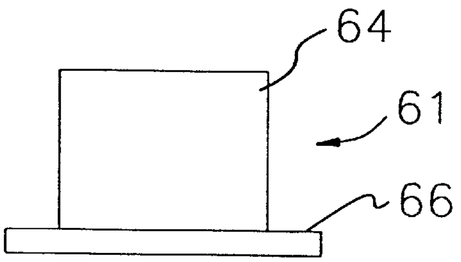
FIG. 8A is a side view of a plug which is part of an alternative embodiment of the pivoting member.
Figure 8B:
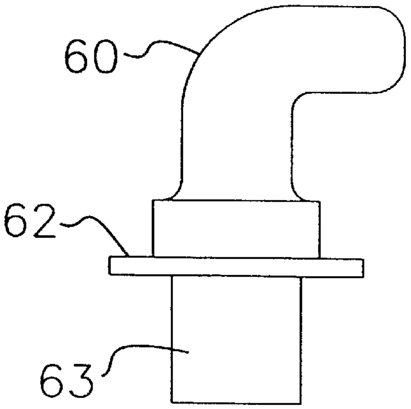
FIG. 8B is a side view of a hook for use with the plug of FIG. 8A.
Figure 8C:
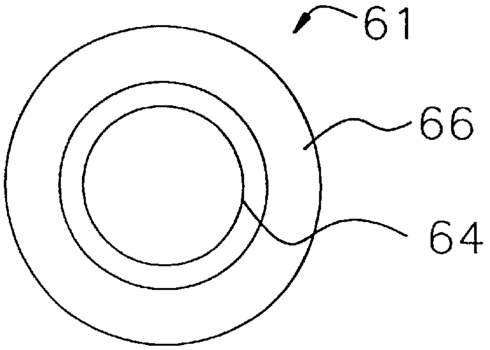
FIG. 8C is a top view of the plug of FIG. 8A.
Figure 8D:
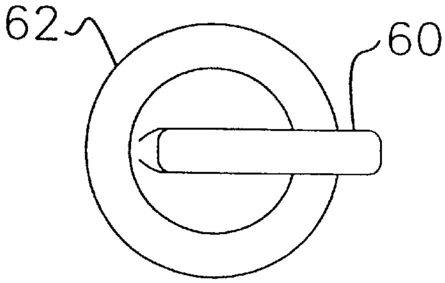
FIG. 8D is a top view of the hook of FIG. 8B.

FIG. 7 is a perspective view of a preferred embodiment of a stop member 50 for use with support 10 of FIG. 6A. While generally it is desirable to allow the pivoting member 30 to float up and down in slot 15, occasionally a need may arise to prevent any non-rotational movement of pivoting member 30. Stop member 50 has a body 52 shaped so as to fit snugly into slot 15 (see FIG. 6A) when cylinder 32 of pivoting member 30 (see FIG. 3) is in slot 15, thereby preventing any movement of cylinder 32, other than rotation. Body 52 has a thickness equal to the thickness of support 10 of FIG. 2. Affixed to either side of body 52 there is a partial rotatable flange 54. Partial rotatable flanges 54 can be rotated into alignment with body 52 to allow body 52 to fit into slot 15, and then be rotated out of alignment with body 52, thereby holding stop member 50 in place.

FIGS. 8A, 8B, 8C and 8D show an alternative embodiment of pivoting member 30 wherein the first function is performed by a hook 60, and the second function is performed by a plug 61. Hook 60 is inserted through eye 29 in handle 22 of wrench 20. Hook 60 is attached to one side of a first circular stabilizer 62, and to an opposite side of first circular stabilizer 62 an inner cylinder 63 is attached. Inner cylinder 63 is inserted into an outer cylinder ring 64, which performs the second function. Outer cylinder ring 64 has an interior diameter equal to a diameter of inner cylinder 63, so that inner cylinder 63 fits snugly into outer cylinder ring 64. Outer cylinder ring 64 has an outer diameter equal to a width of slot 15, so that it can pass through slot 15 (see FIG. 6B). Attached to outer cylinder ring 64 opposite hook 60 is a second circular stabilizer 66. Stabilizers 62 and 66 trap this embodiment of pivoting member 30 in slot 15.

It is to be understood that there are embodiments of pivoting member 30 which are not shown yet still perform the first and second functions. For example, the pivoting member 30 could comprise a clamp, or other member, which grips the exterior of the handle 22.

Figure 9:
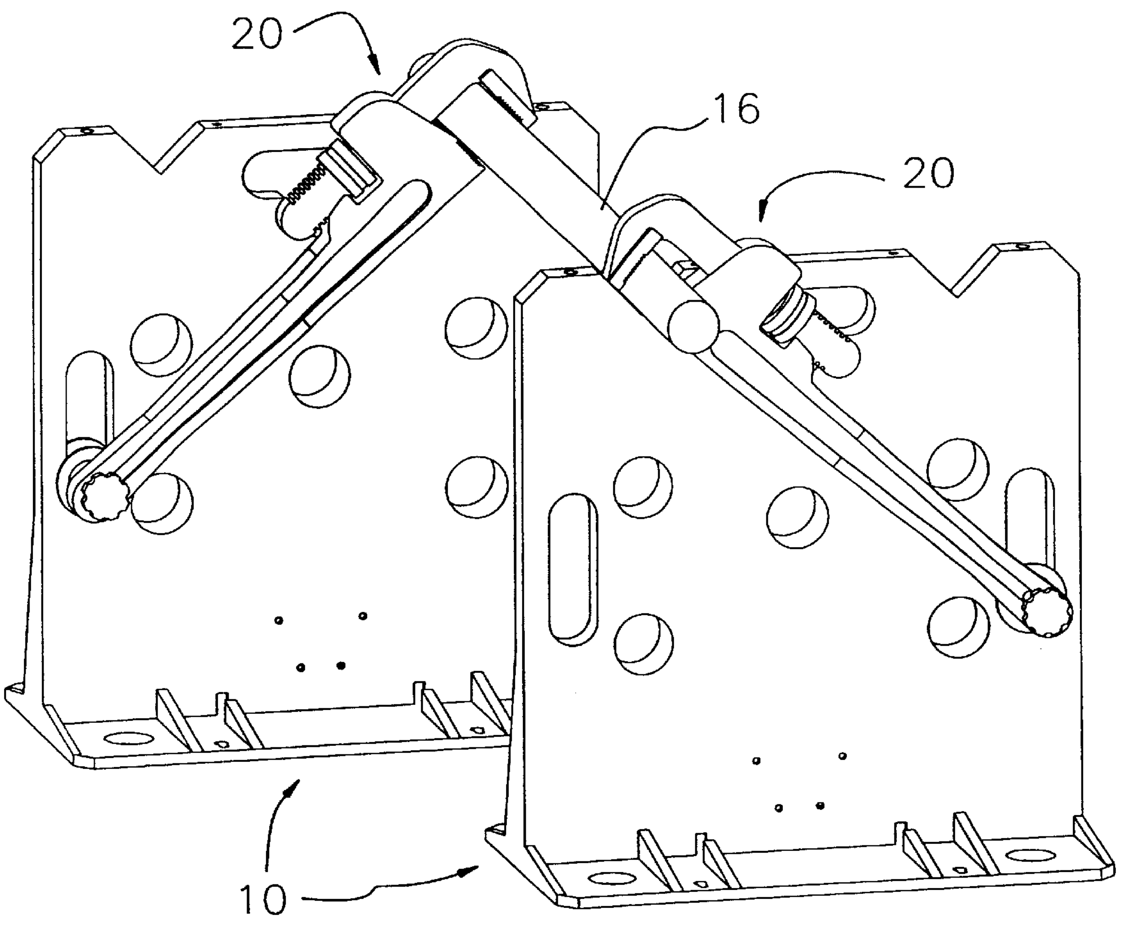
FIG. 9 is an isometric view of an embodiment of the invention showing two supports and two wrenches which prevent the work object from rotating in either sense.

FIG. 9 shows a further preferred embodiment of the invention wherein two supports 10 are placed so that a work object 16 can be held up by them, and two wrenches 20 can engage work object 16, one from each side. A person skilled in the art will realize that this configuration prevents the work object from rotating in either sense.

A still further embodiment of this invention provides two supports in parallel so that an elongated work object can be supported.

Figure 10:
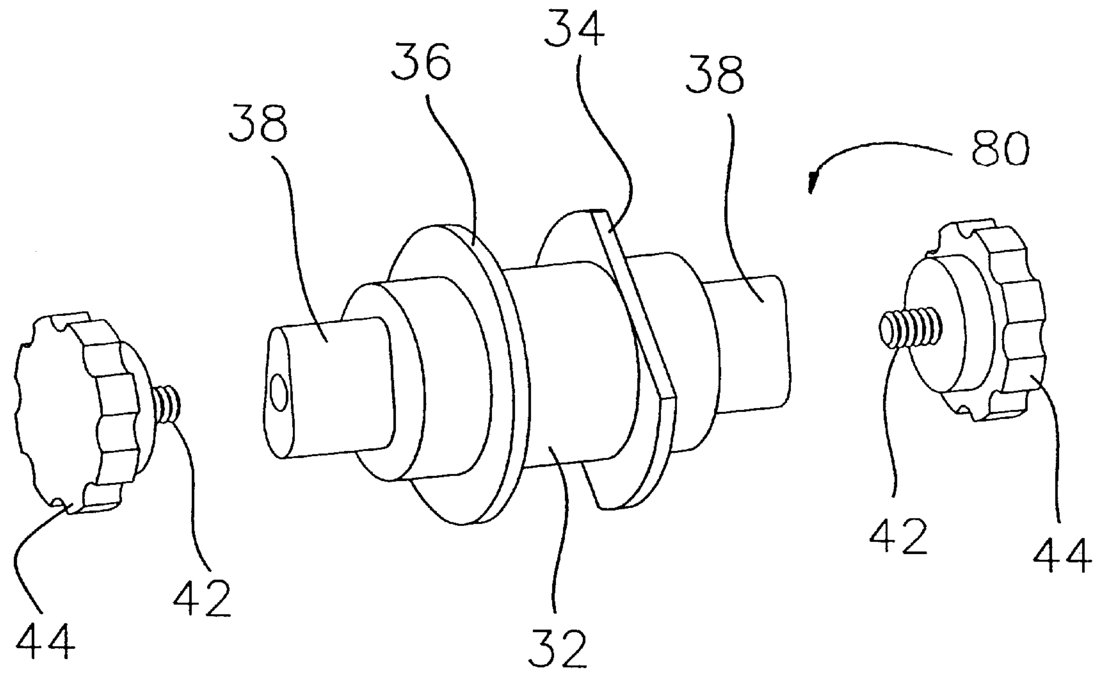
FIG. 10 is an exploded isometric view of an embodiment of the invention that engages two wrenches.

A still further alternative embodiment of the pivoting member is shown in FIG. 10. The embodiment of FIG. 10 provides a pivoting member 80 capable of engaging two wrenches, one on each side of the support, so that when the wrenches engage the work object, the weight of one wrench balances the weight of the other wrench. The individual elements that make up pivoting member 80 are the same as those shown in FIGS. 3 and 4, they are just arranged in a different manner. Cylinder 32 is provided with two elongated projections 38, one attached to each end. Each elongated projection 38 has a threaded hole 40 therein, allowing for knob 44 to be attached thereto by means of screw 42. Truncated flange 34 is attached near a first end of cylinder 32, and circular stabilizer 36 is attached near an opposite end of cylinder 32. Pivoting member 80 functions in essentially the same way as the embodiment of FIGS. 3 and 4, except that once truncated flange 34 has passed through slot 15, a second wrench 20 can be engaged by pivoting member 80. This allows for one wrench 20 to engage work object 16 on each side of support 10. This embodiment is particularly useful in situations where the work object is short, and therefore not suited to being held up by two supports. If only one wrench were used to engage a short work object, the weight of the wrench would cause the short work object to become unbalanced and possibly even fall off the support.

It is to be understood that there are many ways in which this invention could be practised. It is not possible to describe all conceivable embodiments of this invention herein. It would be obvious to any person skilled in the field of this invention that there are alternative embodiments of this invention other than those depicted, which are nevertheless within the scope of this invention as defined by the claims.

What is claimed is:

1. An apparatus for holding a work object, said apparatus comprising:

(a) a support having a work object receiving location associated therewith;

(b) a wrench having a handle and an opening for receiving a work object; and (c) a pivoting member rotationally coupled to said support and capable of engaging said handle of said wrench for enabling said wrench to be rotated between a first position wherein said opening is situated to engage a work object at said work object receiving location, and a second position for not engaging said work object, wherein said pivoting member is coupled to said support at a location such that said wrench is biased by gravity toward said first position.

2. The apparatus of claim 1 wherein wrench comprises a pipe wrench.

3. The apparatus of claim 1 wherein said receiving location is defined by walls of a recess.

4. The apparatus of claim 1 wherein said receiving location is defined by walls of a V-shaped notch.

5. The apparatus of claim 1 wherein said receiving location is defined by a pair of protrusions.

6. The apparatus of claim 1 wherein said support is portable.

7. The apparatus of claim 1 wherein said pivoting member non-rotationally engages said wrench.

8. The apparatus of claim 1 wherein said pivoting member comprises a clamp which detachably engages said handle of said wrench.

9. The apparatus of claim 8 wherein said pivoting member non-rotationally engages said handle of said wrench.

10. The apparatus of claim 1 wherein said wrench has an eye in an end of said handle opposite said work object engaging opening, and said pivoting member engages said wrench by means of an elongated projection inserted in said eye.

11. The apparatus of claim 10 wherein said elongated projection non-rotationally engages said eye.

12. The apparatus of claim 1 wherein said wrench has an eye in an end of said handle opposite said work object engaging opening, and said pivoting member engages said wrench by means of a hook inserted in said eye.

13. The apparatus of claim 12 wherein said hook non-rotationally engages said eye.

14. The apparatus of claim 1 wherein said pivoting member is capable of engaging two wrenches with one of said wrenches on each of two sides of said support.

15. The apparatus of claim 1 wherein said pivoting member is slidably connected to said support.

16. The apparatus of claim 15 further comprising a removable stop member which can be positioned so as to prevent said pivoting member from sliding in said support.

17. The apparatus of claim 1 wherein said pivoting member is detachably connected to said support.

18. The apparatus of claim 17 wherein said pivoting member comprises a truncated flange which may be inserted in a slot in said support.

19. The apparatus of the claim 18 wherein said truncated flange is oriented so that said pivoting member may only be attached to and removed from said support when said wrench is at an angle of between 40 and 60 degrees from the vertical away from said receiving location.

20. An apparatus for holding a work object for use with a wrench having a work object engaging opening and a handle, said apparatus comprising:

(a) a support with a receiving location therein; and (b) a pivoting member rotationally coupled to said support and capable of engaging said wrench at an engagement position along said handle, said pivoting member defining an axis, said pivoting member positioned such that a distance between said axis and said receiving location is approximately equal to a distance between said engagement position along said handle and said work object engaging opening of said engaging member, wherein when a work object rests in said receiving location and said wrench is engaged by said pivoting member, gravity biases said wrench to rotate such that said work object engaging opening of said wrench engages said work object.

21. The apparatus of claim 20 wherein said support is portable.

22. The apparatus of claim 20 wherein said pivoting member comprises a clamp.

23. The apparatus of claim 20 wherein said pivoting member comprises an elongated projection.

24. The apparatus of claim 20 wherein said pivoting member is capable of engaging two wrenches with one of said wrenches on each of two sides of said support.

25. The apparatus of claim 20 wherein said pivoting member is detachably connected to said support.

26. The apparatus of claim 25 wherein said pivoting member comprises a partial flange which may be inserted into a slot in said support.

27. The apparatus of claim 26 wherein said flange is oriented so that said pivoting member may only be attached to and removed from said support when a wrench engaged by said pivoting member is at an angle between 40 and 60 degrees from the vertical away from said receiving location.

28. An apparatus for securing a work object comprising:

(a) a portable support with a notch on a top thereof and a slot near a side thereof;

(b) a pipe wrench with a handle and a work object engaging opening, said handle having an eye in an end opposite said work object engaging opening; and (c) a pivoting member with an elongated projection, a knob, and a truncated flange, wherein, when said elongated projection of said pivoting member is inserted through said eye in said handle of said pipe wrench, and held in place by said knob, and when said truncated flange is inserted through said slot in said support, said pipe wrench can be pivoted about an axis defined by said pivoting member so as to engage a work object resting in said notch in said top of said support.

29. A pivoting member for use with a support having a slot therein and a notch on a top thereof, said pivoting member adapted to enable a pipe wrench, having a mouth and a handle with an eye therein, to secure a work object, said pivoting member comprising:

(a) an elongated projection which fits through said eye so as no non-rotationally engage said wrench;

(b) a knob, attached to said elongated projection, which abuts against said handle of said pipe wrench;

(c) a circular stabilizer, attached to said elongated projection opposite said knob;

(d) a cylinder, attached to said circular stabilizer opposite said elongated projection, which fits through said slot in said support; and, (e) a truncated flange, attached to said cylinder opposite said circular stabilizer, wherein, when said elongated projection of said pivoting member is inserted through said eye in said handle of said pipe wrench, and held in place by said knob, and when said truncated flange is inserted through said slot in said support, said pipe wrench can be pivoted about an axis defined by said pivoting member so as to engage a work object resting in said notch in said top of said support.

* * * * *